(12) United States Patent
Chen

(10) Patent No.: US 9,317,617 B2
(45) Date of Patent: Apr. 19, 2016

(54) TRIP PLAN SHARING AND MATCHING METHOD

(71) Applicant: E-LEAD ELECTRONIC CO., LTD., Changhua (TW)

(72) Inventor: Stephen Chen, Changhua (TW)

(73) Assignee: E-LEAD ELECTRONIC CO., LTD., Changhua (TW)

( * ) Notice: Subject to any disclaimer, the term of this patent is extended or adjusted under 35 U.S.C. 154(b) by 0 days.

(21) Appl. No.: 14/484,962

(22) Filed: Sep. 12, 2014

(65) Prior Publication Data
US 2016/0078140 A1    Mar. 17, 2016

(51) Int. Cl.
| G08G 1/123 | (2006.01) |
| H04B 7/00 | (2006.01) |
| G06F 17/30 | (2006.01) |
| G01C 21/26 | (2006.01) |

(52) U.S. Cl.
CPC .......... G06F 17/30873 (2013.01); G01C 21/26 (2013.01); G06F 17/30867 (2013.01)

(58) Field of Classification Search
USPC ......................................... 701/532; 455/41.2
See application file for complete search history.

(56) References Cited

U.S. PATENT DOCUMENTS

| 8,848,608 | B1 * | 9/2014 | Addepalli | ............. | H04W 4/046 370/328 |
| 2010/0205060 | A1 * | 8/2010 | Athsani | ............... | G01C 21/3484 705/14.58 |
| 2010/0286912 | A1 * | 11/2010 | Inoue | ..................... | G01S 19/48 701/470 |
| 2012/0100806 | A1 * | 4/2012 | Hall | ........................ | B60R 25/24 455/41.2 |
| 2012/0182935 | A1 * | 7/2012 | Addepalli | ............... | H04W 4/02 370/328 |
| 2012/0215754 | A1 * | 8/2012 | Marzani | ................ | F02D 41/266 707/705 |
| 2012/0252364 | A1 * | 10/2012 | Inabathuni | ............. | G08C 17/02 455/41.2 |
| 2013/0078911 | A1 * | 3/2013 | Levien | .................... | H04W 4/18 455/39 |
| 2013/0158838 | A1 * | 6/2013 | Yorke | ................... | B60W 10/06 701/103 |
| 2013/0274955 | A1 * | 10/2013 | Rosenbaum | ............ | G06F 17/00 701/1 |
| 2013/0282283 | A1 * | 10/2013 | Bondesen | ............. | H04W 12/06 701/537 |
| 2015/0163644 | A1 * | 6/2015 | Soda | ........................ | H04W 4/06 455/3.06 |
| 2015/0185030 | A1 * | 7/2015 | Monroe | .................. | G01C 21/34 701/532 |

* cited by examiner

Primary Examiner — Thomas G Black
Assistant Examiner — Tyler Paige
(74) Attorney, Agent, or Firm — Guice Patents PLLC

(57) ABSTRACT

A trip plan sharing and matching method is disclosed. The method allows a user can edit a destination datum by a map website. When the user presses a share button via a mobile device, the map website transmits the destination datum to a web serve and stores the destination datum in the mobile device account of the web server. The mobile device periodically transmits a first matching message to the web server. When the vehicle mounted device enables a share reception, the vehicle mounted device periodically transmits a second matching message to the web server. If the web server confirms the first matching message to the second matching message, the web serve transmits the destination datum to the vehicle mounted device and then the vehicle mounted device executes a navigation process according to the destination datum.

9 Claims, 6 Drawing Sheets

TRIP PLAN SHARING AND MATCHING METHOD

BACKGROUND OF THE INVENTION (a) Field of the Invention

The present invention generally relates to a trip plan sharing and matching method, in particular to a method capable of sharing the trip plan of a mobile device to a vehicle mounted device in order to allow the mobile device to set the destination inside or outside the vehicle and to automatically transmit the set destination datum to the matched vehicle mounted device and then enable the navigation function.

(b) Description of the Prior Art

With the rapid development of the vehicle mounted audio, the function of the vehicle mounted audio becomes more and more powerful. At the beginning, the vehicle mounted audio can only serve as an audio receiver. After a period of time, the vehicle mounted audio further provides a cassette player. Next, the vehicle mounted audio further provides a CD player. Now, the vehicle mounted audio further provides a DVD player. With the advance of the technology, the vehicle mounted audio already has the navigation function and Bluetooth, etc. In general, common navigation devices can only allow users to set the destination on the vehicle to execute the navigation function.

There are many embodiments about setting the destinations for the navigation function, which have already disclosed by many public patent applications, such as Taiwan application patent number TW 201407134, TW 200912360, TW 201017120, TW I404919, TW 200622071, TW 200944755, TW 200910182, TW I393860, TW I355606, TW I297395 and TW I306347.

Although these public patent applications already disclosed the technical contents of editing data (destinations) via the Internet and transmitting the data to the navigation device via E-mails and mobile devices, these public patent applications still have some problems to be overcome. For example, the user has to actively confirm the sent messages and the vehicle mounted device cannot automatically share the trip plan of the user's mobile device, such as TW 201407134, which discloses a destination plan method (as shown in FIG. 1); the method comprises: (a) editing a destination and transmitting files; (b) receiving the files by using an electronic device and a navigation device; (c) using the destination files. Although the method can provide convenient input interface of the vehicle mounted device, but it cannot share the trip plan of the mobile device to the vehicle mounted device.

SUMMARY OF THE INVENTION

In order to overcome the shortcomings of the prior art, the inventor of the present invention keeps trying to improve the prior art. Finally, the inventor develops the trip plan sharing and matching method of the present invention. One of the primary objects of the present invention is to provide the method capable of sharing the trip plan of a mobile device to a vehicle mounting device in order to allow the mobile device to set the destination inside or outside the vehicle and then automatically and correctly transmit the set destination to the matched vehicle mounted device to perform the navigation.

To achieve the foregoing objective, the present invention provides a trip plan sharing and matching method, and the method comprises the following steps:

(a) the database of a web server comprises at least one vehicle mounted device account, at least one mobile device account and a map website, wherein the vehicle mounted device account comprises the basic datum of at least one vehicle mounted device and the mobile device account comprises the basic datum of at least one mobile device; and the dedicated micro application (APP) of the map website is installed on the mobile device and the mobile device is connected to the web server; a user edits a destination datum by the dedicated micro application of the map website; when the user presses a share button, the method proceeds to the step (b);

(b) the dedicated micro application of the map website transmits the destination datum to the web server and stores the destination datum in the mobile device account, wherein the mobile device transmits a first matching message to the web server every a second time period during a first time period; and then the method proceeds to the step (c);

(c) when the vehicle mounted device enables a share reception, the vehicle mounted device transmits a second matching message every the second time period to the web sever, wherein the web server determines whether the first matching message matches the second matching message; if the first matching message matches the second matching message, the web server transmits the destination datum to the vehicle mounted device, and the method proceeds to the step (d); and (d) the vehicle mounted device executes a navigation process according to the destination datum.

In a preferred embodiment of the present invention, the basic datum of the vehicle mounted device is a universally unique identifier (UUID) or a serial number.

In a preferred embodiment of the present invention, the basic datum of the mobile device is a Bluetooth device location (MAC address) or an universally unique identifier (UUID).

In a preferred embodiment of the present invention, the mobile device is a smart phone or a tablet computer.

In a preferred embodiment of the present invention, the mobile device communicates with the web server by 3G, 4G, 5G, WI-FI or the Internet.

In a preferred embodiment of the present invention, the vehicle mounted device is a vehicle mounted computer, a vehicle mounted audio, and a vehicle mounted head-up display device or a GPS device.

In a preferred embodiment of the present invention, the step (c) further comprises the following step: if there are multiple first matching message from multiple mobile devices matching the second matching message of the vehicle mounted device, the web server transmits multiple destination data to the vehicle mounted device, wherein these destination data are displayed on the display of the vehicle mounted device and a driver chooses one of these destination data for the vehicle mounted device to execute the navigation process.

In a preferred embodiment of the present invention, the first time period is two minutes, and the second time period is two seconds.

In a preferred embodiment of the present invention, the first matching message and the second matching message comprise speed, direction and coordinate.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The technical content of the present invention will become apparent by the detailed description of the following embodiments and the illustration of related drawings as follows.

Figure 1:
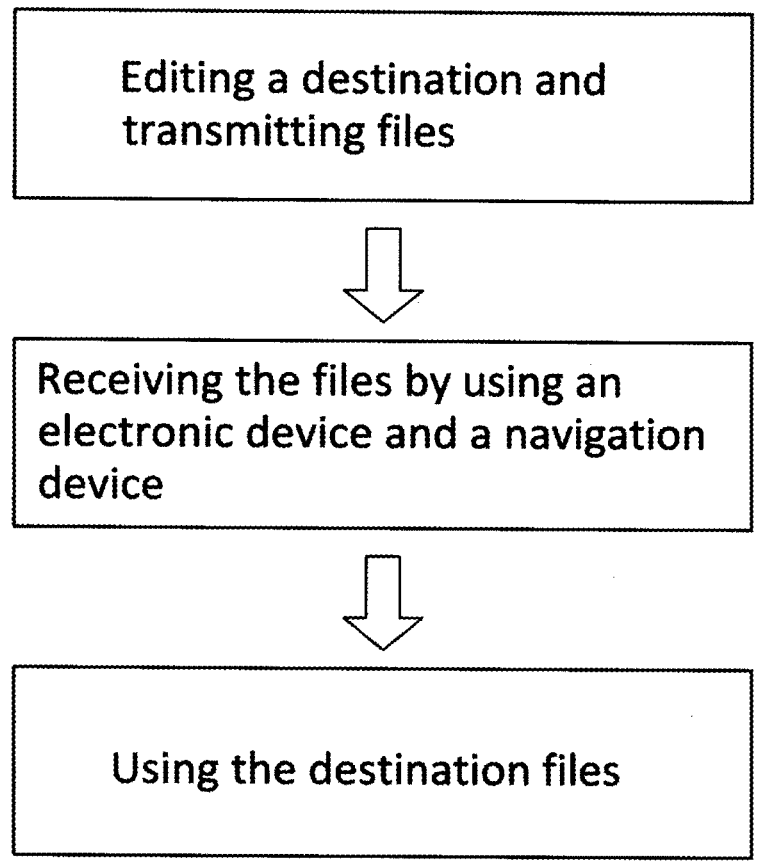
FIG. 1 is the flow chart of the conventional method.
Figure 2:
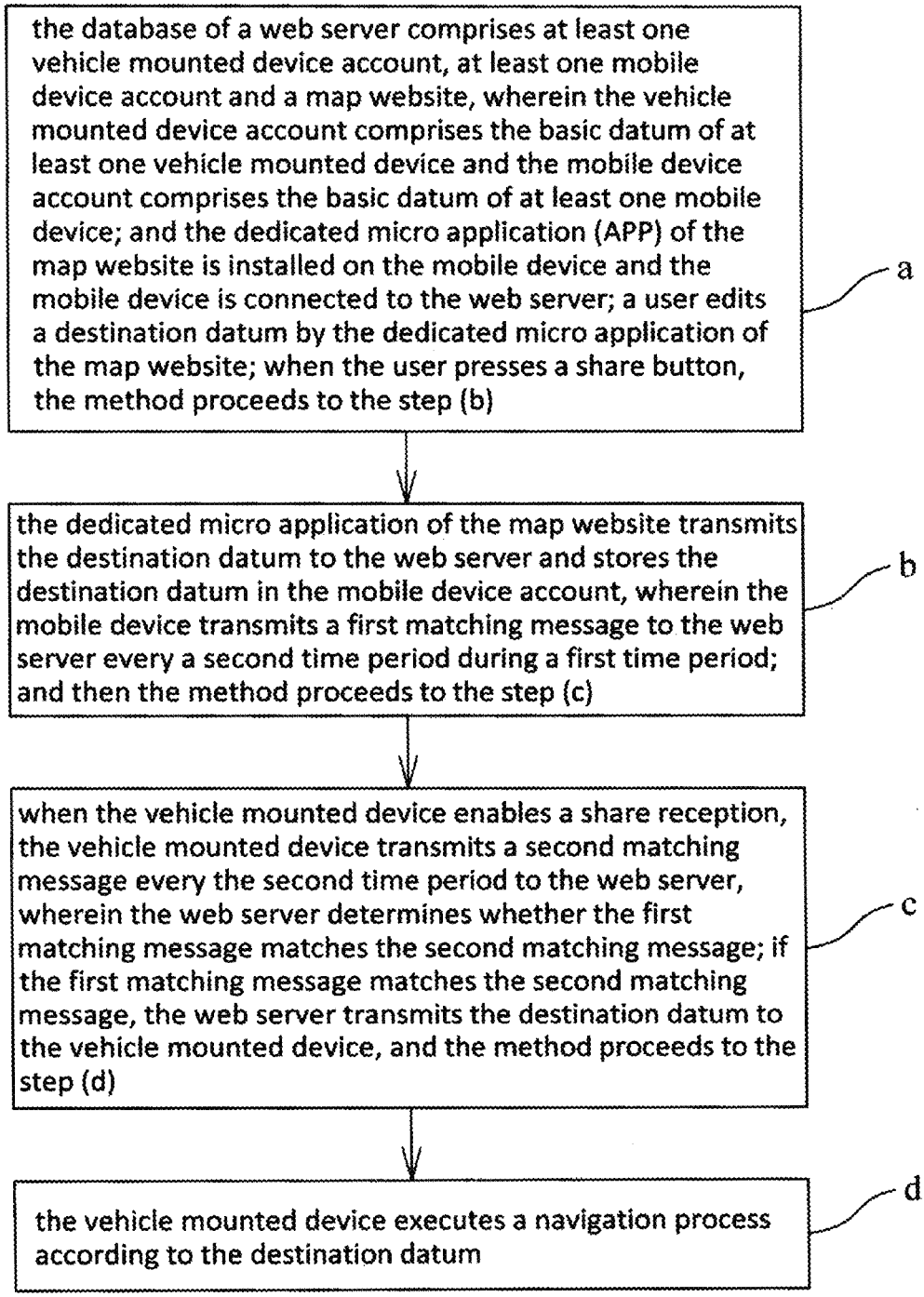
FIG. 2 is the flow chart of the method according to the present invention.
Figure 3:
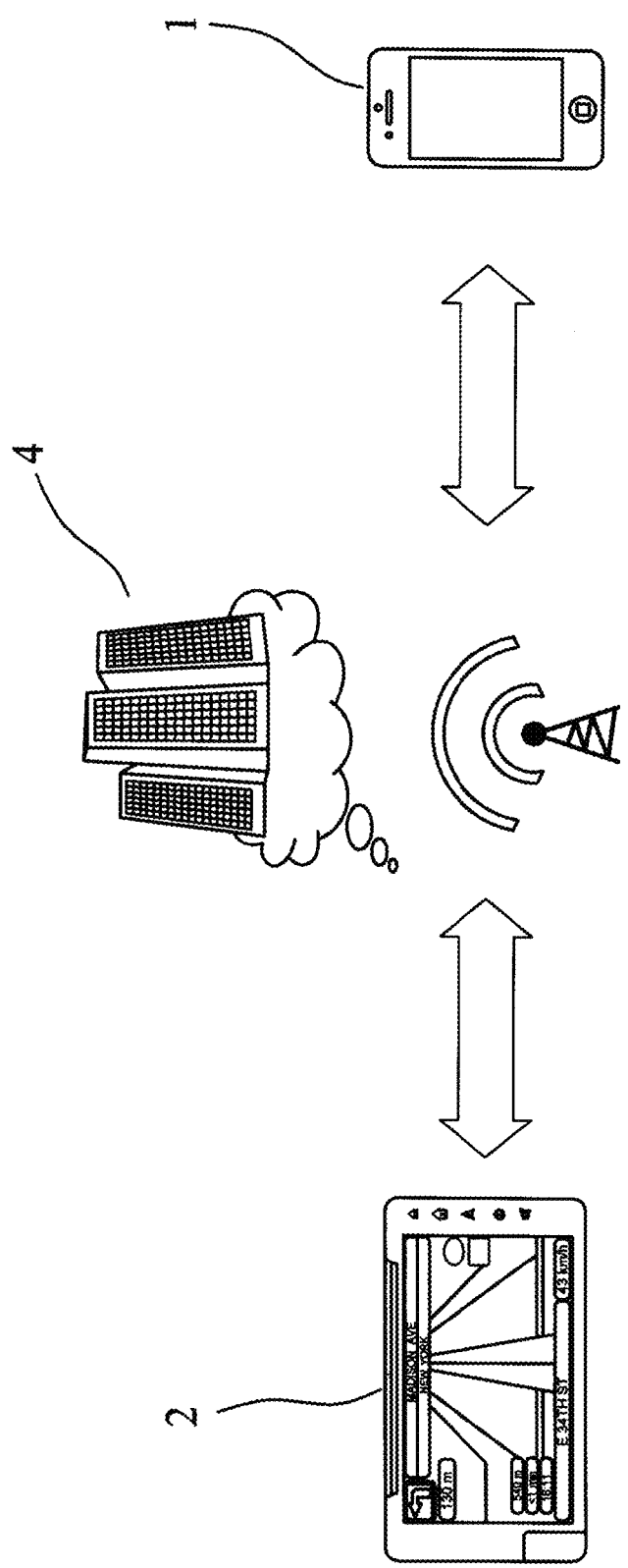
FIG. 3 is the schematic view of the system structure according to the present invention.
Figure 4:
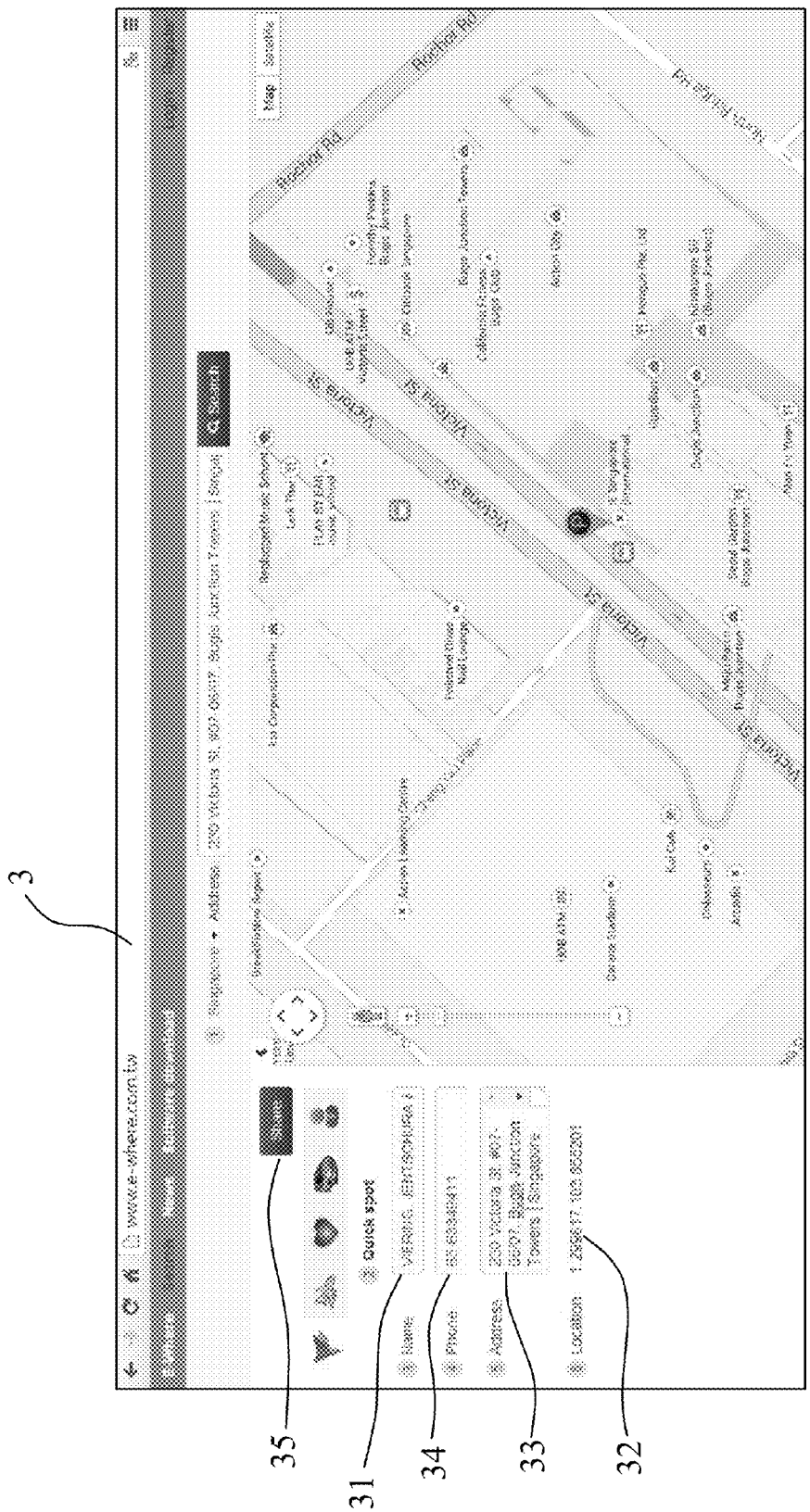
FIG. 4 is the schematic view of the map website according to the present invention.

Please refer to FIGS. 2, 3 and 4; the trip plan sharing and matching method comprises the following steps:

(a) the database of the web server 4 comprises at least one vehicle mounted device account, at least one mobile device account and the map website 3, wherein the vehicle mounted device account comprises the basic datum of at least one vehicle mounted device 2 and the mobile device account comprises the basic datum of at least one mobile device 1; and the dedicated micro application (APP) of the map website 3 is installed on the mobile device 1 and the mobile device 1 is connected to the web server 4; the user edits a destination datum by the dedicated micro application (APP) of the map website 3; when the user presses a share button 35, the method proceeds to the step (b);

[In the step (a), the database of the web server 4 comprises at least one vehicle mounted device account, at least one mobile device account and the map website 3; and the mobile device comprises the basic datum of at least one mobile device 1, wherein the mobile device 1 is a smart phone or a tablet computer and the basic datum of the mobile device 1 is a Bluetooth device location or an universally unique identifier (UUID); the vehicle mounted device account comprises the basic datum of at least one vehicle mounted device 2, which is a an universally unique identifier (UUID) or a serial number, wherein the vehicle mounted device 2 is a vehicle mounted computer, a vehicle mounted audio, a vehicle mounted head-up display device or a GPS device.

The dedicated micro application (APP) of the map website 3 is installed on the mobile device 1 and the mobile device 1 is connected to the web server 4, wherein the mobile device 1 communicates with the web server 4 by 3G, 4G, 5G, WI-FI or the Internet.

The user can edit the datum of a destination or the data of multiple destinations via the dedicated micro application (APP) of the map website 3. The datum of the destination is a tourist spot, a location or a contact method, and the location is a coordinate 32 with latitude and longitude or an address 33 mark; besides, the contact method is a phone number 34. When the user presses the share button 35, the method proceeds to the step (b).]

(b) the dedicated micro application (APP) of the map website 3 transmits the destination datum to the web server 4 and stores the destination datum in the mobile device account, wherein the mobile device 1 transmits a first matching message to the web server 4 every a second time period during a first time period; and then the method proceeds to the step (c)

[In the step (b), the dedicated micro application (APP) of the map website 3 transmits the destination datum to the web server 4 and stores the destination datum in the mobile device account, wherein the mobile device 1 transmits the first matching message to the web server 4 every the second time period (i.e. two minutes) during the first time period (i.e. ten seconds); the first matching message includes speed, direction, coordinate, etc; then the method proceeds to the step (c).]

(c) when the vehicle mounted device 2 enables the share reception, the vehicle mounted device 2 transmits a second matching message every the second time period to the web sever 4, wherein the web server 4 determines whether the first matching message matches the second matching message; if the first matching message matches the second matching message, the web server 4 transmits the destination datum to the vehicle mounted device 2, and the method proceeds to the step (d);

[When the vehicle mounted device 2 enables the share reception, the vehicle mounted device 2 transmits a second matching message every the second time period to the web sever 4, wherein the second matching message includes speed, direction, coordinate, etc; the web server 4 determines whether the first matching message matches the second matching message; if the first matching message matches the second matching message, the web server 4 transmits the destination datum to the vehicle mounted device 2, and the method proceeds to the step (d).]

(d) the vehicle mounted device 3 executes the navigation process according to the destination datum.

Figure 5:
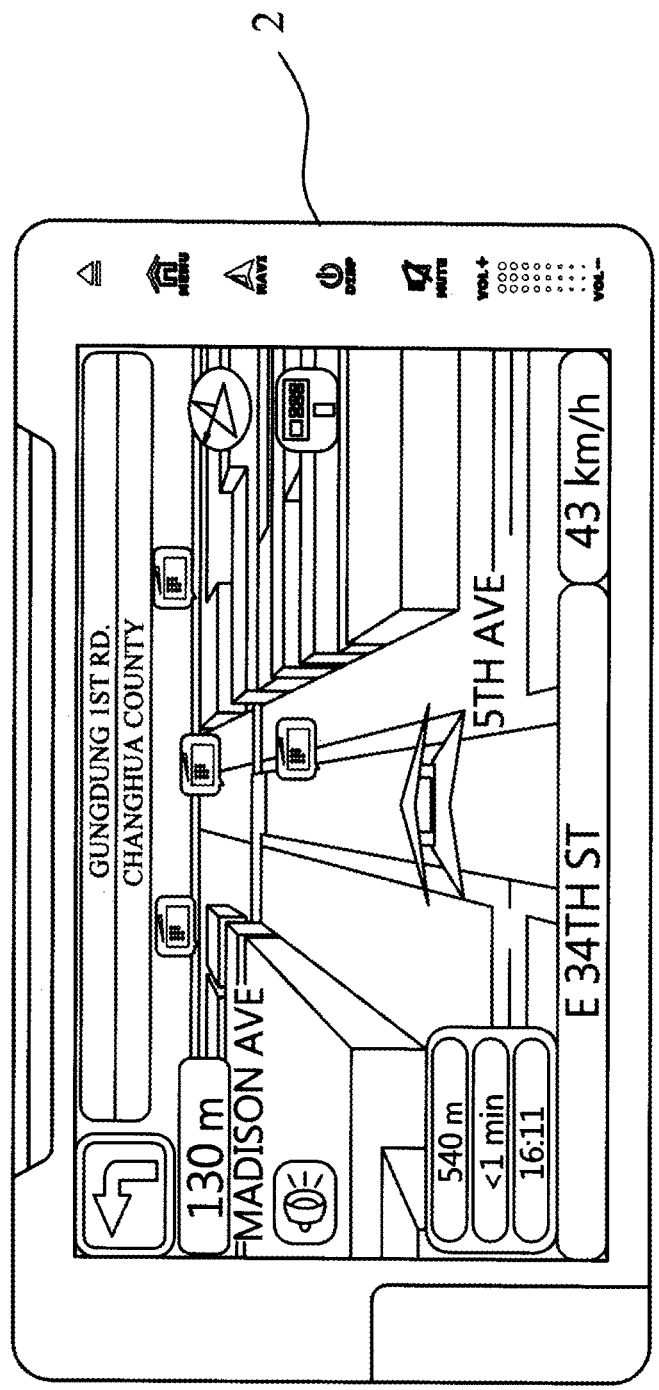
FIG. 5 is the schematic view of the navigation function of the display module of the vehicle mounted device according to the present invention.

[In the step (d), the vehicle mounted device 3, as shown in FIG. 5, executes the navigation process according to the destination datum.]

Figure 6:
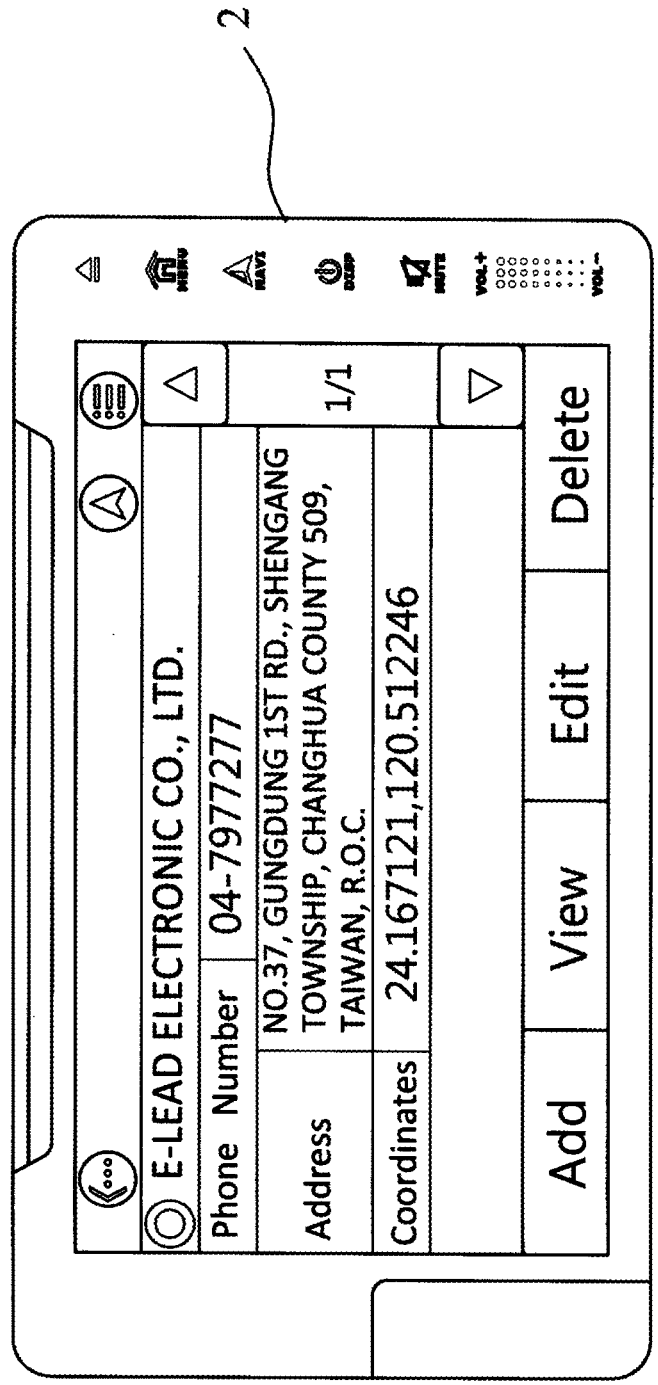
FIG. 6 is the schematic view of the display module of the vehicle mounted device according to the present invention.

Please refer to FIG. 6; the driver can display the destination datum on the display module and the driver can select the contact information, such as the phone number, to directly dial the phone number; if the map website 3 has set the date and time, the date and time will automatically be displayed on the display to remind the user.

In the above step (c), if there are multiple first matching message from multiple mobile devices 1 matching the second matching message of the vehicle mounted device 2, the web server 4 will transmit multiple destination data to the vehicle mounted device 2 to display these destination data on the display of the vehicle mounted device 2 and then the driver can choose one of these destination data for the vehicle mounted device 2 to execute the navigation process.

The trip plan sharing and matching method according to the present invention can significantly enhance the overall functions of the vehicle mounted device and the mobile device for the user to conveniently use them. For instance, the user can set the destination via the dedicated micro application (APP) of the map website 3 before getting in the vehicle and the destination will be transmitted to the web server 4 and stored in the vehicle mounted device account of the user. When the mobile device 1 (i.e. a mobile phone) shares the destination stored in the dedicated micro application (APP) by performing the "sharing data to the nearby vehicle mounted device 2 (i.e. a car radio)" function, the mobile device 1 will transmit its GPS location, speed and direction, etc., to the web server 4 every a short time period (i.e. 10 seconds) during a time period (i.e. two minutes); similarly, when the vehicle mounted device enables the share reception, it will also transmit its GPS location, speed and direction, etc., to the web server 4 every a short time period. Next, the web server 4 will match the GPS location, speed and direction of the mobile devices 1 currently sharing data with those of the vehicle mounted devices currently accepting data sharing in order to find out the best match. Afterward, the web server 4 transmits the location of the mobile device 1 to the vehicle mounted device 2 and then set the location as the destination. Therefore, the feature of the present invention is that the present invention is able to share the destination to any person even if the person is not one of the contacts (for example, if the user wants to take a taxi, the user can share the destination to the vehicle mounted device 2 of the taxi and transmit the location of the user's mobile device 1 to set the location as the destination in order to perform the navigation; thus, the overall functions of the mobile device 1 and the vehicle mounted device 2 can be effectively enhanced).

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A trip plan sharing and matching method, comprising the following steps:
   (a) a database of a web server comprising at least one vehicle mounted device account, at least one mobile device account and a map website, wherein the vehicle mounted device account comprises a basic datum of at least one vehicle mounted device and the mobile device account comprises a basic datum of at least one mobile device; and a dedicated micro application of the map website is installed on the mobile device and the mobile device is connected to the web server; a user edits a destination datum by the dedicated micro application of the map website; when the user presses a share button, the method proceeds to the step (b);
   (b) the dedicated micro application of the map website transmitting the destination datum to the web server and storing the destination datum in the mobile device account, wherein the mobile device transmits a first matching message to the web server every a second time period during a first time period; and then the method proceeds to the step (c);
   (c) when the vehicle mounted device enabling a share reception, the vehicle mounted device transmitting a second matching message every the second time period to the web server, wherein the web server determines whether the first matching message matches the second matching message; when the first matching message sent from the mobile device to the web server matches the second matching message sent from the vehicle mounted device to the web server, the web server transmits the destination datum to the vehicle mounted device, and the method proceeds to the step (d); and
   (d) the vehicle mounted device executing a navigation process according to the destination datum.

2. The method of the claim 1, wherein the basic datum of the vehicle mounted device is an universally unique identifier or a serial number.

3. The method of the claim 1, wherein the basic datum of the mobile device is a BLUETOOTH device location or an universally unique identifier.

4. The method of the claim 1, wherein the mobile device is a smart phone or a tablet computer.

5. The method of the claim 1, wherein the mobile device communicates with the web server by 3G®, 4G®, 5G®, WI-FI® or Internet.

6. The method of the claim 1, wherein the first time period is two minutes, and the second time period is two seconds.

7. The method of the claim 1, wherein the vehicle mounted device is a vehicle mounted computer, a vehicle mounted audio, a vehicle mounted head-up display device or a GPS device.

8. The method of the claim 1, wherein the step (c) further comprising the following step:
   if there being multiple first matching message from multiple mobile devices matching the second matching message of the vehicle mounted device, the web server transmitting multiple destination data to the vehicle mounted device, wherein these destination data are displayed on a display of the vehicle mounted device and a driver chooses one of these destination data for the vehicle mounted device to execute the navigation process.

9. The method of the claim 1, wherein the first matching message and the second matching message respectively comprise a speed, a direction and a coordinate.

* * * * *